United States Patent
Rogers (10) Patent No.: US 9,512,952 B2
(45) Date of Patent: Dec. 6, 2016

(54) LATERAL REINSTATEMENT CUTTER AND SINGLE ACCESS POINT METHOD OF USE

(71) Applicant: Neil Rogers, New Port Richey, FL (US)

(72) Inventor: Neil Rogers, New Port Richey, FL (US)

(73) Assignees: Geoffrey E. Parmer, Tampa, FL (US); Neil Rogers, New Port Richey, FL (US)

( * ) Notice: Subject to any disclaimer, the term of this patent is extended or adjusted under 35 U.S.C. 154(b) by 316 days.

(21) Appl. No.: 14/188,809

(22) Filed: Feb. 25, 2014

(65) Prior Publication Data
US 2014/0169886 A1   Jun. 19, 2014

Related U.S. Application Data

(63) Continuation-in-part of application No. 14/074,339, filed on Nov. 7, 2013, now abandoned.

(60) Provisional application No. 61/723,562, filed on Nov. 7, 2012.

(51) Int. Cl.
*F16L 55/18* (2006.01)
*F16L 55/26* (2006.01)

(52) U.S. Cl.
CPC .................................. *F16L 55/265* (2013.01)

(58) Field of Classification Search
CPC ............................. F16L 55/265; F16L 55/179
See application file for complete search history.

(56) References Cited

U.S. PATENT DOCUMENTS 4,197,908 A * 4/1980 Davis .................... B26F 1/0038
166/50
4,577,388 A * 3/1986 Wood ...................... B23D 21/02
166/55
4,648,454 A * 3/1987 Yarnell ................... B23B 41/00
166/297
4,819,721 A * 4/1989 Long, Jr. .................. E03F 3/06
166/55
5,044,824 A * 9/1991 Long, Jr. .................. E03F 3/06
156/287

(Continued)

OTHER PUBLICATIONS

Erik H. Nielsen. "Keeping Up with Lateral Reinstatement." Trenchless Technology. <http://trenchlessonline.com/index/webapp-stories-action/id.2435/archive.yes/Issue.2013-02-01/title.keeping-up-with-lateral-reinstatement>. Published Feb. 2, 2013. Retrieved Nov. 7, 2013. 2 pages.

(Continued)

*Primary Examiner* — Benjamin Fiorello
(74) *Attorney, Agent, or Firm* — Gardner Groff Greenwald & Villanueva, PC (57) ABSTRACT

A pivot drive, a pivot, a cutter drive, a cutting head, and a camera are mounted to a base, and a remote control system operates the pivot drive to pivot the cutter drive from a stored to a use position, operates the cutter drive to rotationally drive the cutting head, and operates the camera to provide images of the cutting head used to cut out blockages at lateral connections of relined pipes. The camera and the cutting head are positioned in a spaced apart relationship facing each other, with the base extending beyond the cutting head sufficiently to provide this spacing. Optionally, the camera is mounted to a trailing portion of the base and the cutter drive is mounted to a leading portion, with control lines for the pivot and cutter drives routed back past but retained separated from the cutting head to avoid damage.

17 Claims, 8 Drawing Sheets

(56) References Cited

U.S. PATENT DOCUMENTS

| | | | | |
|---|---|---|---|---|
| 5,153,718 | A * | 10/1992 | Massar | E21B 29/06 166/55.2 |
| 5,197,540 | A * | 3/1993 | Yagi | F16L 55/179 166/55.8 |
| 5,207,031 | A * | 5/1993 | Gammelgaard | E03F 3/06 15/104.09 |
| 5,540,613 | A * | 7/1996 | Kamiyama | F16L 55/28 451/151 |
| 5,960,882 | A * | 10/1999 | Polivka | F16L 55/265 166/297 |
| 6,085,794 | A * | 7/2000 | Kamiyama | F16L 55/179 138/97 |
| 6,123,109 | A * | 9/2000 | Kamiyama | F16L 55/179 138/97 |
| 6,386,797 | B1 * | 5/2002 | Gearhart | F16L 55/265 166/55.7 |
| 8,015,695 | B2 | 9/2011 | Polivka et al. | |
| 2004/0078954 | A1 * | 4/2004 | Crocker | F16L 55/179 29/522.1 |
| 2005/0103538 | A1 * | 5/2005 | Cotton | F16L 55/30 180/9.1 |
| 2009/0223335 | A1 * | 9/2009 | Tsujisama | F16L 55/265 83/177 |
| 2014/0165869 | A1 * | 6/2014 | Flanery | F16L 55/265 104/138.2 |

OTHER PUBLICATIONS

Sharon M. Bueno. "Talking Lateral Cutters." Trenchless Technology. <http://trenchlessonline.com/index/webapp-stories-action/id.580/archive.yes/Issue.2008-08-01/title.talking-lateral-cutters>. Published Aug. 1, 2008. Retrieved Nov. 7, 2013. 2 pages.

Aries Industries, Inc. "Control Lateral Reinstatement Cutters Remotely." <http://www.ariesindustries.com/products-view/lateral-reinstatement-cutters-2/>. Published in 2012. Waukesha, WA. Retrieved Nov. 7, 2013. 1 page.

Cues. "Cues Kangaroo Lateral Reinstatement Cutters" <http://www.cuesinc.com/CuttersNew.html>. Retrieved Nov. 7, 2013. 1 page.

Primeline Products, Inc. "MaxCutter". <http://www.prime-line.net/maxliner-maxcutter.html>. Retrieved Dec. 19, 2013. 1 page.

* cited by examiner

LATERAL REINSTATEMENT CUTTER AND SINGLE ACCESS POINT METHOD OF USE

CROSS REFERENCE TO RELATED APPLICATION

This application is a continuation-in-part of U.S. patent application Ser. No. 14/074,339 filed Nov. 7, 2013, which claims the priority benefit of U.S. Provisional Patent Application No. 61/723,562 filed Nov. 7, 2012, which are hereby incorporated by reference herein.

TECHNICAL FIELD

The present invention relates generally to trenchless pipeline rehabilitation, and particularly to lateral reinstatement cutters for unblocking lateral connections of relined pipes.

BACKGROUND

When pipes carrying a flowable material (e.g., liquid, gas, or semi-solid sludge) age and deteriorate, they begin to leak and must be rehabilitated. This rehabilitation is important for pipes such as buried sewer and water pipes, as well as for vent pipes. Traditionally, sewer and water pipes were dug up and replaced, which is extremely costly and time-consuming. To avoid this, trenchless pipeline rehabilitation techniques have been developed. These techniques involve relining the pipes from one dug-up access location, without digging an access/replacement trench along the entire length of the pipe. Typical relining techniques use a cured-in-place PVC reliner to form a sealed pipe-within-a-pipe.

But when relining mainline pipes, oftentimes connections (junctions) for laterals (branch pipes) become blocked (completely closed up or partially constricted) by the material relining the main pipe, thereby completely or partially restricting flow into the laterals of the pipe system. Such reliner blockages are typically cut out using lateral reinstatement cutters. Lateral reinstatement cutters are cutting tools that are inserted into mainline pipes to remotely cut out reliner blockages at lateral connection points from within the relined pipe. A conventional lateral reinstatement cutter is disclosed by U.S. Pat. No. 8,015,695, which is hereby incorporated by reference herein.

While conventional lateral reinstatement cutters are operable to re-open blocked laterals, they have their drawbacks. One such drawback is that for use, a camera must be inserted into the pipe at a separate/second access location (e.g., a dug-out pit) from the first access location where the reliner and cutter equipment is inserted. The camera is needed to remotely observe the position and function of the cutter so it can be controlled properly. But this two-point entry method can require significant additional time and effort to locate and access (e.g., dig up) the second access location. This is particularly problematic for vertical stack pipes, as accessing the second lower access location can be difficult, and the shavings from the cutting process typically fall onto the camera lens obscuring the image of the cutter. In addition, conventional lateral reinstatement cutters do not fit into two- or three-inch pipes, and are only usable to reline larger-diameter pipes. Because of such drawbacks, the most time-consuming and difficult task in many pipe relining applications is reinstating the lateral connections.

Accordingly, it can be seen that needs exist for improvements to lateral reinstatement cutters and methods of use thereof to make it quicker and easier to reinstate lateral connections during pipe relining work. It is to the provision of solutions to these and other problems that the present invention is primarily directed.

SUMMARY

Generally described, the present invention relates to lateral reinstatement cutters and single-access-point methods for use in cutting out blockages to lateral branch pipes that are caused during relining (e.g., cured-in-place PVC) of pipes. The reverse lateral reinstatement cutters in use provide for one-point entry in any (including smaller) diameter pipe. In typical embodiments, the cutter is pneumatically powered, though other embodiments are adapted for other power sources such as another fluid (e.g., hydraulic) or electricity. In typical embodiments, the cutter is designed for use in 2- to 4-inch plumbing pipes, though other embodiments are adapted for use in larger or smaller diameter pipes for the same or other applications such as wastewater.

In example embodiments, the reverse lateral reinstatement cutter includes a pivot drive, a pivot, a cutter drive, a cutting head, and a camera mounted to a base, and a remote control system operates the pivot drive to pivot the cutter drive from a stored to a use position, operates the cutter drive to rotationally drive the cutting head, and operates the camera to provide images of the cutting head used to cut out blockages at lateral connections of relined pipes. The camera and the cutting head are positioned in a spaced apart relationship facing each other, with the base extending beyond the cutting head sufficiently to provide this spacing. Typically, the camera is mounted to a trailing portion of the base and the cutter drive is mounted to a leading portion, with control lines for the pivot and cutter drives routed back past but retained separated from the cutting head to avoid damage to the control lines by the cutting head.

The specific techniques and structures employed to improve over the drawbacks of the prior devices and accomplish the advantages described herein will become apparent from the following detailed description of example embodiments and the appended drawings and claims.

DETAILED DESCRIPTION OF EXAMPLE EMBODIMENTS

Generally described, the present invention relates to lateral reinstatement cutters and single access point methods for use in cutting out blockages to lateral branch pipes that are caused during relining of pipes. The cutters can be used to reopen blockages of pipe reliners such as a cured-in-place PVC or another type of lining to cut out complete and/or partial blockages.

FIGS. 1-12 show a lateral reinstatement cutter 10 according to a first example embodiment of the present invention. The cutter 10 includes a pivot drive 12, a pivot 14, a cutter drive 16, a cutting head 18, and a camera 20, all mounted to a mounting base 22. The cutter 10 also includes a control system 24 that functions to operate the pivot drive 12, the cutter drive 16, and the camera 20 to provide the functionality described herein.

These components can be assembled together by conventional fasteners such as screws, nuts and bolts, rivets, straps, ties, clamps, adhesives, and/or the like. Also, these components can be made using materials and fabrication techniques that are well-known in the art and used for other conventional lateral reinstatement cutters. Any disclosed dimensions and proportions are representative for illustrating example embodiments and are not limiting of the invention.

It should be noted that in some embodiments not all of these components are provided and assembled together by the manufacturer before delivery to the end user. For example, the camera 20 can be provided separately and mounted to the base 22 by the end user, thereby allowing for a wider selection of cameras and enabling use of separately provided (e.g., existing) cameras. Similarly, the cutting head 18 can be provided separately and coupled to the cutter drive 16 by the end user, thereby allowing for a wider selection of cutting heads and enabling use of separately provided (e.g., existing) cutting heads.

The pivot drive 12 is mounted to the base 22 and operates to drive the pivot 14 to induce the cutter drive 16 to pivot between a stored/in-line position and a use/pivoted position. The pivot drive 12 is typically provided by a conventional pneumatic cylinder with a piston that reciprocates linearly in operation. In the depicted embodiment, for example, the pivot drive 12 is a pneumatic cylinder with a piston 26 that reciprocates linearly between a stored position (FIG. 10) and a use position (FIG. 11) in operation. The stored position of the piston 26 can be retracted and the use position extended, as shown, or the cutter 10 can be easily adapted to reverse this. Suitable air cylinders are commercially available from Bimba Manufacturing Company (University Park, Ill.) such as Model No. SR-041-DP. In other embodiments, the pivot drive is provided by another type of fluid cylinder (e.g., a hydraulic cylinder), another linear reciprocating drive (e.g., a solenoid or spring-biased plunger), a drive that produces another type of motion (e.g., a rotary motor), or another drive device that operates to provide the functionality of driving the pivot 14 to induce the rotary drive 16 to pivot from a stored position to a use position.

The pivot 14 is driven by the pivot drive 12 to pivot between stored and use positions, and operates to pivot the between the stored and use positions. The pivot 14 is typically provided by a conventional linkage element, and can be made of metal, plastic, or another material selected for strength and durability. In the depicted embodiment, for example, the pivot 14 includes an L-shaped member 28 that rotationally engages the cutter drive 16, is engaged by the pivot drive 12, and translates between a stored/normal position (FIG. 10) and a use/pivoted position (FIG. 11) in operation, and a pivot pin 30 that pivotally mounts the cutter drive to the mounting base 22. Pivots of this type are conventional and known to those of ordinary skill in the art, so for brevity additional structural details are not provided herein. In other embodiments, the pivot is provided by another type of linkage that translates the driving motion of the pivot drive 12 to a pivoting motion of the cutter drive 16. For example, the pivot can be provided by a ramped structure/surface of or attached to the cutter drive 16 and/or the piston of the pivot drive 12 for inter-engagement between the two components, a rack-and-pinion gear-set, a cam-and-follower linkage, or another linkage that operates to provide the functionality of being driven by the pivot drive 12 to induce the cutter drive 16 (and the attached cutting head 18) to pivot from the stored position to the use position. As such, the pivot can be provided as an integral part of the pivot drive, the cutter drive, or both.

The cutter drive 16 is driven by the pivot drive 12 via the pivot 14 to pivot between stored and use positions (FIGS. 10 and 11, respectively), and operates to rotationally drive the cutting head 18. Typically, the cutter drive 16 is mounted to and pivots with the pivot 14, as depicted, though in some embodiments it is pivotally mounted to the base 22 and engaged (e.g., pushed or pulled) by the pivot to cause the pivotal motion between the stored and use positions. The cutter drive 16 is typically provided by a conventional pneumatic rotary motor. In the depicted embodiment, for example, the cutter drive 16 is a pneumatic rotary motor including a shaft 32 that rotates in operation and that includes a releasable coupling 34 for removably attaching the cutting head 18. The releasable coupling 34 can be provided by a conventional grommet (e.g., a basic ⅜-inch grommet), a conventional twist-to-lock bit coupling, or another conventional releasable coupling known in the art, thereby allowing users to purchase a wide range of cutting heads from their choice of suppliers. Suitable air motors are commercially available from Nestor Sales LLC (Largo, Fla.) under the brand name AIR NESCO. In other embodiments, the cutter drive is provided by another type of fluid rotary motor (e.g., a hydraulic motor), another rotary drive (e.g., an electric motor), a drive that produces another type of motion (e.g., a linear reciprocating device) and is coupled to a motion (e.g., linear-to-rotary) converter, or another drive device that operates to provide the functionality of rotationally driving the cutting head 18.

The cutting head (i.e., bit) 18 is coupled to and rotationally driven by the cutter drive 16 in operation to engage and cut out blockages in lateral connections. Typically, the cutting head 18 is removably coupled to the releasable coupling 34 of the rotary drive shaft 32 of the cutter drive 16 and can be easily replaced after its useful lifetime and/or for a different job. The cutting head 18 can be of a conventional type commonly used with lateral reinstatement cutters. For example, suitable cutting heads are commercially available from Ryobi Limited (Anderson, S.C.) such as Model No. A25RS15. The cutter 10 can be provided with a set (e.g., five) of the replaceable cutting heads 18 packaged together for the convenience of the user, or the cutting head can be provided separately.

In other embodiments for use in the same, related, or different pipe-maintenance applications (i.e., not necessarily removing lateral blockages), the cutters can be fitted with alternative or additional pipe-maintenance tool heads mounted to the cutter drive, such as by replacing the cutting head with a cleaning, scraping, chipping, heating, ultrasound, and/or tool head. In some such other embodiments, the other tool heads do not need to be repositioned from stored to use positions—as these are one and the same—and as such the pivot drive and/or pivot can be eliminated. And in some such other embodiments, the tool heads are not designed for being rotationally driven and instead the cutter drive is replaced by a tool head drive delivering a drive motion that can be delivered or translated to that particular tool head (e.g., a linear reciprocating or helical motion).

The camera 20 is mounted to the base 22 to capture images (e.g., video) of the position and operation of the cutting head 18 that can be remotely viewed by an operator of the cutter 10 so that the cutting head 18 can be properly controlled. Typically, the camera 20 is removably mounted to the base 22 so that it can be easily replaced (and optionally repositioned) as may be desired from time to time. For example, the camera 20 can be removably mounted to the base 22 by straps 36, as depicted, or by other removable fasteners such as ties, tape, screws, nuts and bolts, clamps, clips, snap-fit connections, hook-and-loop fasteners, and the like. The camera 20 can be of a conventional type commonly used in with lateral reinstatement cutters, and as such it typically includes a flash (not shown) and is of a durable design and construction. For example, suitable cameras are commercially available from Ridge Tool Company (Elyria, Ohio), trade name RIDGID, such as Model No. 32902 under the brand name SEESNAKE. The camera 20 can be provided with the cutter 10 it can be provided separately. In other embodiments, the camera 20 is not mounted to the cutter 10, and instead is provided as a separately positionable component that can be separately inserted into the pipe (e.g., after the cutter) from the same single access location as the cutter after the cutter has been inserted.

The control system 24 includes conventional control components that function to operate the pivot drive 12, the cutter drive 16, and the camera 20 to provide the functionality described herein. Thus, the control system 24 includes a control line 40 for the pivot drive 12, a control line 42 for the cutter drive 16, and a controller 44 that operates the pivot drive and the cutter drive via the control lines. In the depicted embodiment, for example, the control system 24 includes an air delivery line 40 for the pneumatic pivot drive 12, an air delivery line 42 for the pneumatic cutter drive 16, an feed air line 43 connected to the delivery lines, a compressed air supply (not shown) (e.g., a portable tank of compressed air, or at least one air compressor) to which the feed air line is connected, a controller 44 with flow-control devices (not shown) (e.g., valves or on/off controls) that open and close the air lines to activate and deactivate the pivot and cutter drives, and a T-shaped handle 45 to which these components are mounted for use. In use, the flow-control devices of the controller 44 are operated to open the cutter air line 42 to deliver compressed air to the cutter drive 12 to rotationally drive the cutting head 18 and to open the pivot air line 40 to deliver compressed air to the pivot drive 12 to pivot the cutter drive and thus the cutting head from the stored position to the use position to cut through the reliner blockage.

The air lines 40 and 42 can be provided by conventional tubing in any length desired, for example fifty-foot lengths. And the air lines 40 and 42 can include basic universal fittings for connecting together multiple of the lines in series to provide longer lengths, so these connections can be easily and inexpensively sourced. In other embodiments, the control lines are connected directly to dedicated compressed air supplies, and the controller is effectively the integral valves of compressed air tanks, the integral on/off controls of air compressors, etc. And in yet other embodiments, the control lines and the controller can be provided by other components for use to operate other types of pivot and cutter drives, as would be readily understood by a person of ordinary skill in the art.

In addition, the control system 24 includes controls to operate the camera 20. In the depicted embodiment, for example, the control system 24 includes a controller (not shown) and an electric line 50 extending between the controller and the camera 20. The controller typically includes one or more conventional control buttons (not shown) for activating the camera 20 and optionally for zooming, focusing, and/or aiming the camera, as well as a display (not shown) for viewing the images (e.g., video) captured by the camera. The electric line 50 can be provided by conventional control wiring in any length desired, for example fifty-foot lengths. And the electric line 50 can include basic universal fittings for connecting together multiple of the lines in series to provide longer lengths, so these connections can be easily and inexpensively sourced. In other embodiments, the communication between the controller 44 and the camera 20 is via a wireless connection (e.g., via an RF signal such as a Wi-Fi signal) and as such the control line 52 is not included.

The base 22 supports the pivot drive 12, the pivot 14 (and/or the cutter drive 16), and the camera 20, and is elongate so that the cutter drive, the cutting head 18, and the camera can be positioned in series (e.g., generally axially aligned) along the longitudinal axis of the base. In the depicted embodiment, for example, the base includes a main body 60, an endcap 62, and an extension adapter 66. The main body 60 typically has a curved outer surface, and as such can be generally semi-cylindrical as depicted, to facilitate smooth sliding within tubular pipes. In some embodiments, the cutter 10 includes one or more skids (not shown) that permanently or removably attach to the base 22 to further facilitate smooth sliding within tubular pipes. The endcap 62 can attach to a leading portion 68 of the main body 60, with a wall of the base 22 extending circumferentially farther around at the leading portion than at a trailing portion 70 of the main body, to substantially enclose and protect the pivot drive 12. The extension adapter 66 extends axially from the trailing portion 70 of the base 22 and provides a location for engagement by a control rod 72. In other embodiments, the extension adapter is integrally formed with the main body as a single part, or the main body is longer and the extension adapter as a separate part is eliminated. And in yet other embodiments, the main body and/or the endcap are combined into fewer parts, and/or the endcap is eliminated.

To move the cutter 10 along within the pipe 8, the cutter can be used with a control rod 72 of a conventional type. For example, the control rod 72 can be provided by a rigid push (i.e., push/pull) rod in any length desired, for example fifty-foot lengths. And the control rod 72 can include basic universal quick-connect fittings for connecting together multiple of the rods in series to provide longer lengths, so these connections can be easily and inexpensively sourced. In some embodiments, the control rod 72 and the cutter 10 include mating fittings (e.g., a hook and a loop, bayonet fitting elements, threaded screw elements, laterally slide-release head and receiver elements, or other male and female elements) that releasably engage each other to facilitate ease of use. In other embodiments, the cutter includes wheels, one or more wheel drives, and a controller that communicates (e.g., via wires or wirelessly) with the wheel drives to control the direction and speed of the wheels to maneuver the cutter through the pipe. And in yet other embodiments, the cutter includes other conventional transport systems that are known in the art and operable to move the cutter along the pipe.

Having described the basic components of the cutter 10, some innovative features of it will now be detailed. As noted herein, the cutter 10 is designed to provide for reinstating blockages in relined pipes from a single access point/location, so that a separate/second access location does not need to be identified and accessed (e.g., dug up in buried-pipe applications). To provide this functionality, the cutting head 18 and the camera 20 are spaced apart on the elongate base 22, with the cutting tip 19 of the cutting head and the lens 21 of the camera facing each other, and with a fixed gap 74 between them. As such, the elongate base 22 supports the cutter drive 16 and extends longitudinally/axially past the cutting head 18 a sufficient distance to provide a location to mount the camera 20 with a gap 74 between the camera lens 21 and the cutting tip 19. The gap 74 between the camera lens 21 and the cutting tip 19 is typically selected to be large enough that reliner shavings from the blockage cutting do not tend to be cast onto and collect on the camera lens, small enough that the image (e.g., video) captured by the camera is clear, and coordinated with the selected camera to provide a full image of the lateral connection to be cut out. In typical embodiments, for example, the gap 74 between the camera lens 21 and the cutting tip 19 is about four inches to about six inches, though in some embodiments for certain applications it can be greater or less than this.

In addition, to enhance use in certain applications such a vertical vent pipes, the cutter drive 16 and the camera 20 can include an innovative positional arrangement on the base 22. In the depicted embodiment, the cutter drive 16 is mounted on the leading portion 68 of the base 22, and the camera 20 is mounted on the trailing portion 70 of the base, with the gap 74 thereby formed between them. As such, the cutting head 18 faces the single access location (i.e., the operator) and pivots forward about a pivot point 30 that is forward of the cutting tip 19, instead of the opposite/conventional arrangement. In this way, when the cutter 10 is inserted into a pipe, the cutting head 18 on the leading portion 68 goes in before the camera 20 on the trailing portion 70. So for a generally vertical pipe with an upper access location (e.g., a roof exhaust vent), the cutting head 18 is lowered into the pipe before the camera 20 and so the camera is positioned above the cutting head. Accordingly, reliner shavings from cut-out blockages do not fall onto the camera lens 21 and obscure the captured image.

But with this arrangement, the air lines 40 and 42 are routed back past the cutting head 18, which has the potential to damage them. To address this issue, the air lines 40 and 42 can be retained on the base 22 by retainers 76 such as pins, clips, brackets, straps, or other conventional retaining elements for air lines (or other control lines as the case may be). Furthermore, to help keep the air lines 40 and 42 separated away from the cutting head 18, the base 22 can include at least one opening 78 into which the air lines can be routed and received. In the depicted embodiment, the opening 78 is in the form of a slot extending longitudinally/axially from the leading portion 68 adjacent the cutter drive 16 to the trailing portion 70 past the cutting tip 19, and the retainers 76 are in the form of pins extending laterally across the base 22 above and retaining the air lines 40 and 42 in the slot and away from the cutting head. In another embodiments, one hole/opening is provided for routing the air lines to the opposite side (from the cutting head) of the base, and optionally another hole/opening is provided for routing the air lines back, for example with the air lines received in an inward recess formed on the outer surface of the base.

FIGS. 13-16 show a lateral reinstatement cutter 110 according to a second example embodiment of the present invention. The cutter 110 of this embodiment is similar to that of the first embodiment in that it includes a pivot drive 112, a pivot 114, a cutter drive 116, a cutting head (not shown), a camera (not shown), a mounting base 122, and a control system (not shown) that functions to provide substantially the same functionality of single-access-point insertion and optionally camera-last insertion. For brevity, details of common features will not be elaborated on, and only some differences will be noted.

The base 122 of the cutter 110 includes some different arrangements of the same basic elements. For example, the main body 160 in is in the form of a rectangular bar and its air-line opening 178 is in the form of a conduit on the opposite side from the cutting head. Thus, the air lines are routed into the leading portion open end of the conduit opening 178, extend through the conduit opening, and exit from the trailing portion open end of the conduit opening. In this way, the air lines are retained separated away from damage by the cutting head.

Figure 1:
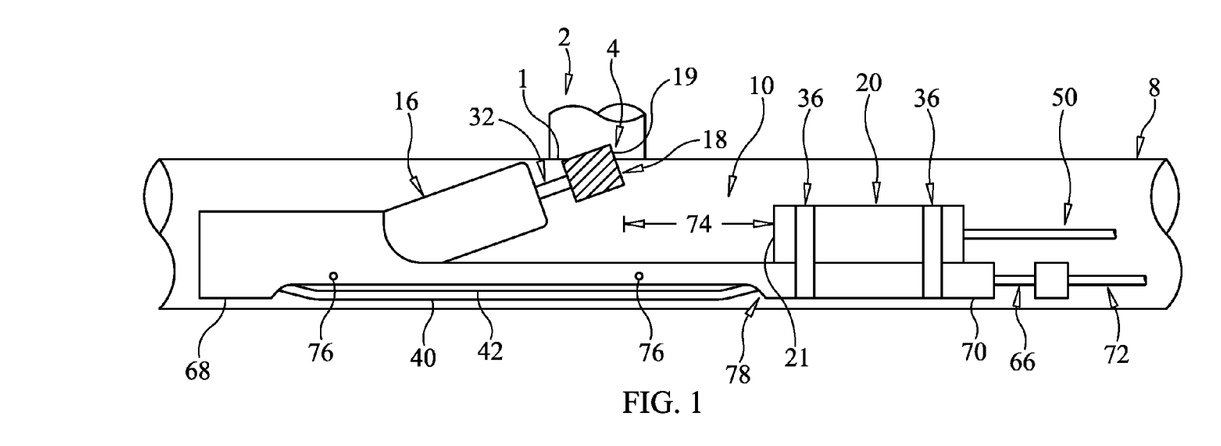
FIG. 1 is a side view of a lateral reinstatement cutter according to a first example embodiment of the invention, showing the cutter inserted into a pipe, a cutting head pivoted to a cutting position, and a camera facing the cutting head.
Figure 2:
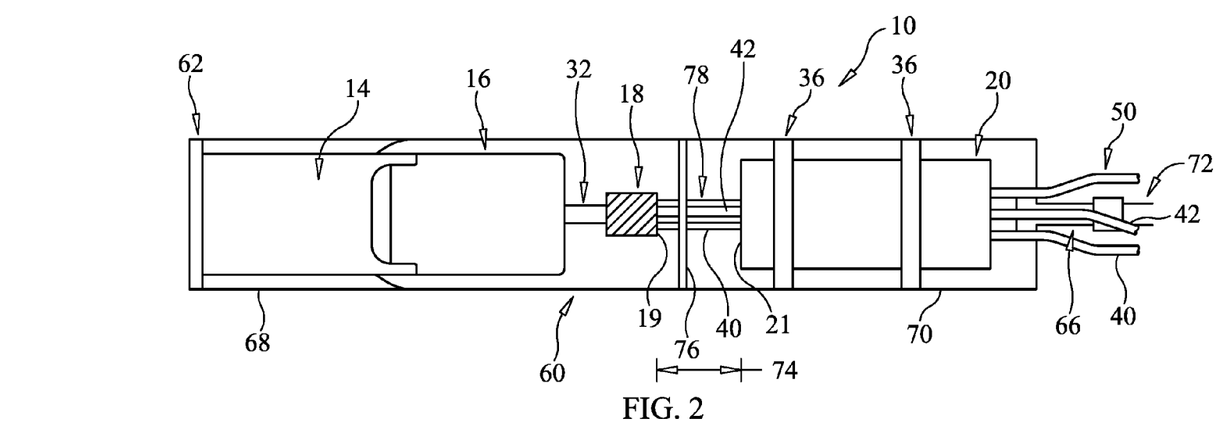
FIG. 2 is a top view of the cutter of FIG. 1.
Figure 3:
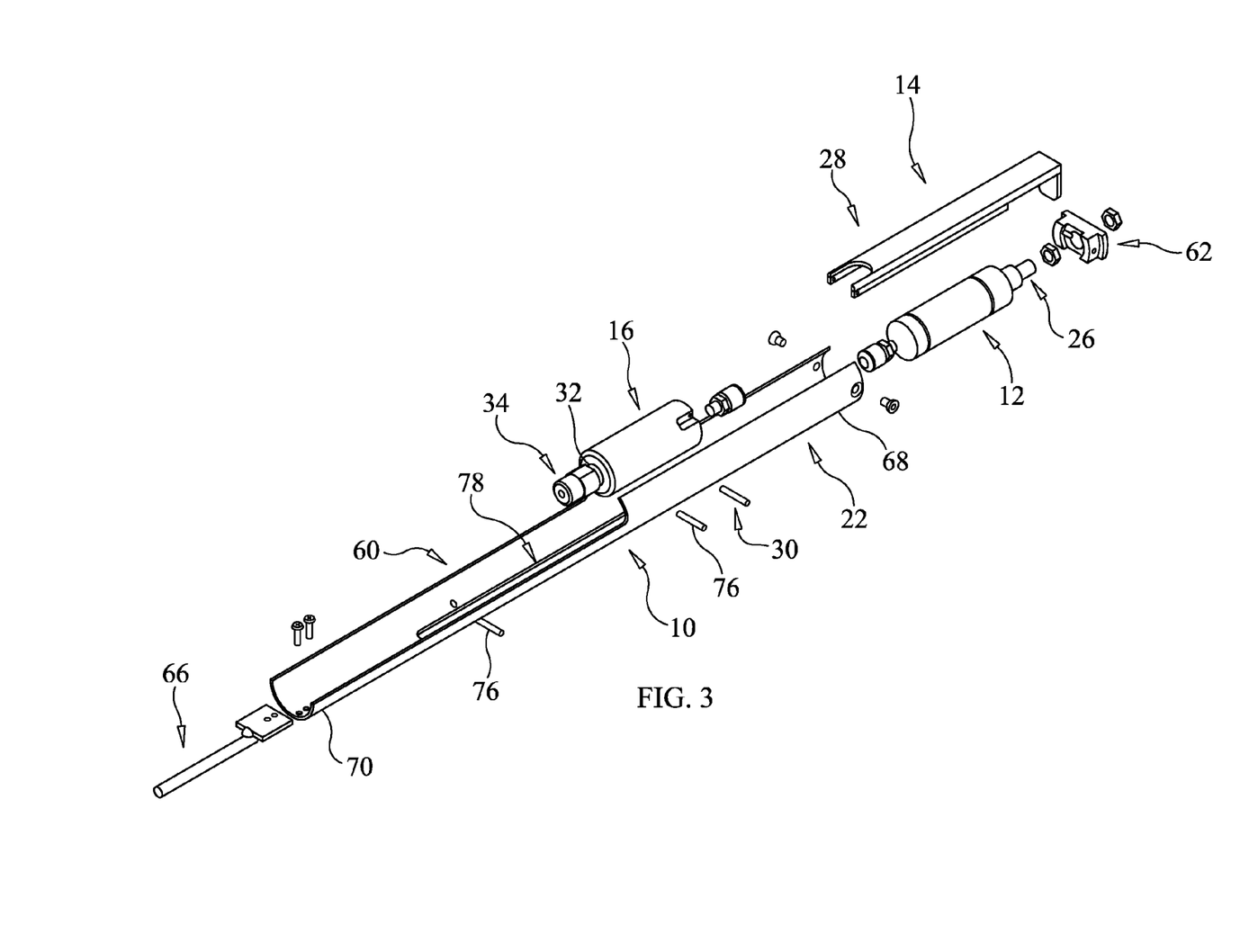
FIG. 3 is an exploded view of the cutter of FIG. 1.
Figure 4:
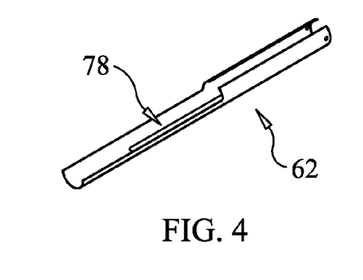
FIG. 4 is a perspective view of a main body of a mounting base of the cutter of FIG. 1.
Figure 5:
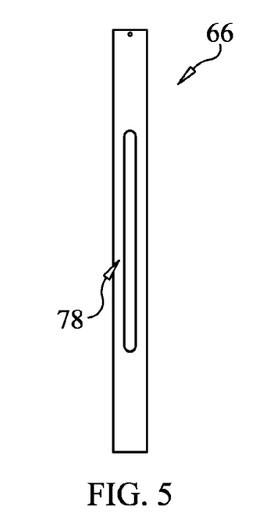
FIG. 5 is a bottom view of the main body of FIG. 4.
Figure 6:
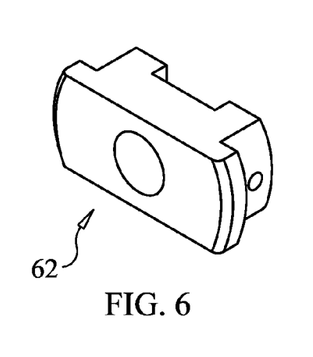
FIG. 6 is a perspective view of an end cap of a mounting base of the cutter of FIG. 1.
Figure 7:
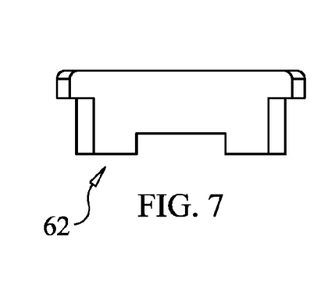
FIG. 7 is a side view of the end cap of FIG. 6.
Figure 8:
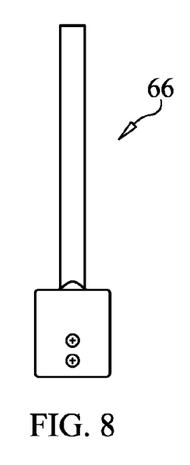
FIG. 8 is a top view of an extension adapter of a mounting base of the cutter of FIG. 1.
Figure 9:
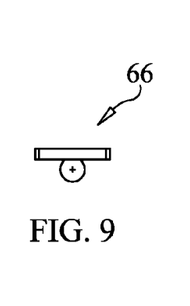
FIG. 9 is an end view of the extension adapter of FIG. 8.
Figure 10:
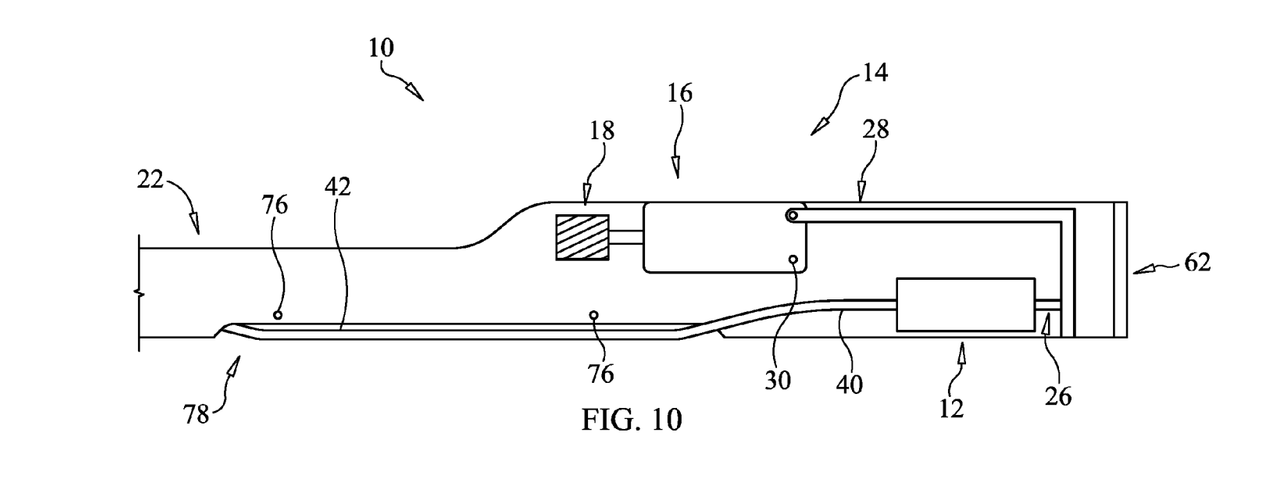
FIG. 10 is a longitudinal cross-sectional view of a portion of the cutter of FIG. 1, showing the cutting head in a stored position and control lines retained away from the cutting head.
Figure 11:
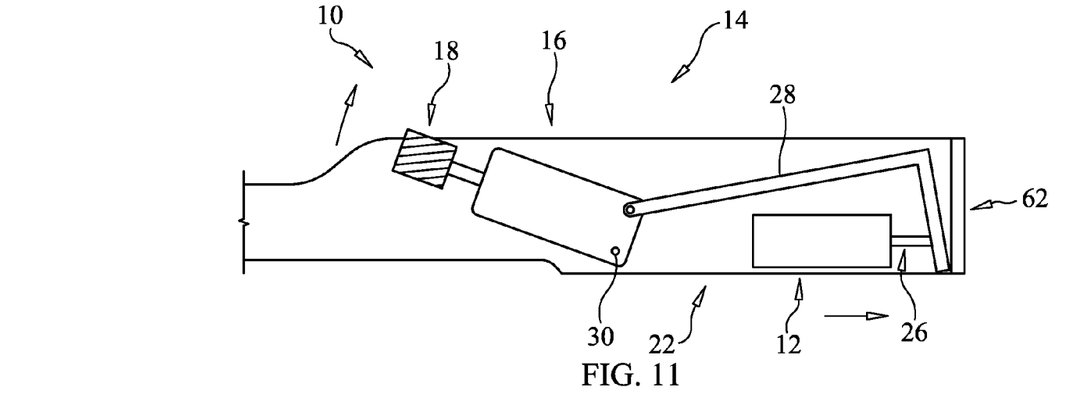
FIG. 11 shows a portion of the cutter of FIG. 10 with the cutting head in the use position.
Figure 12:
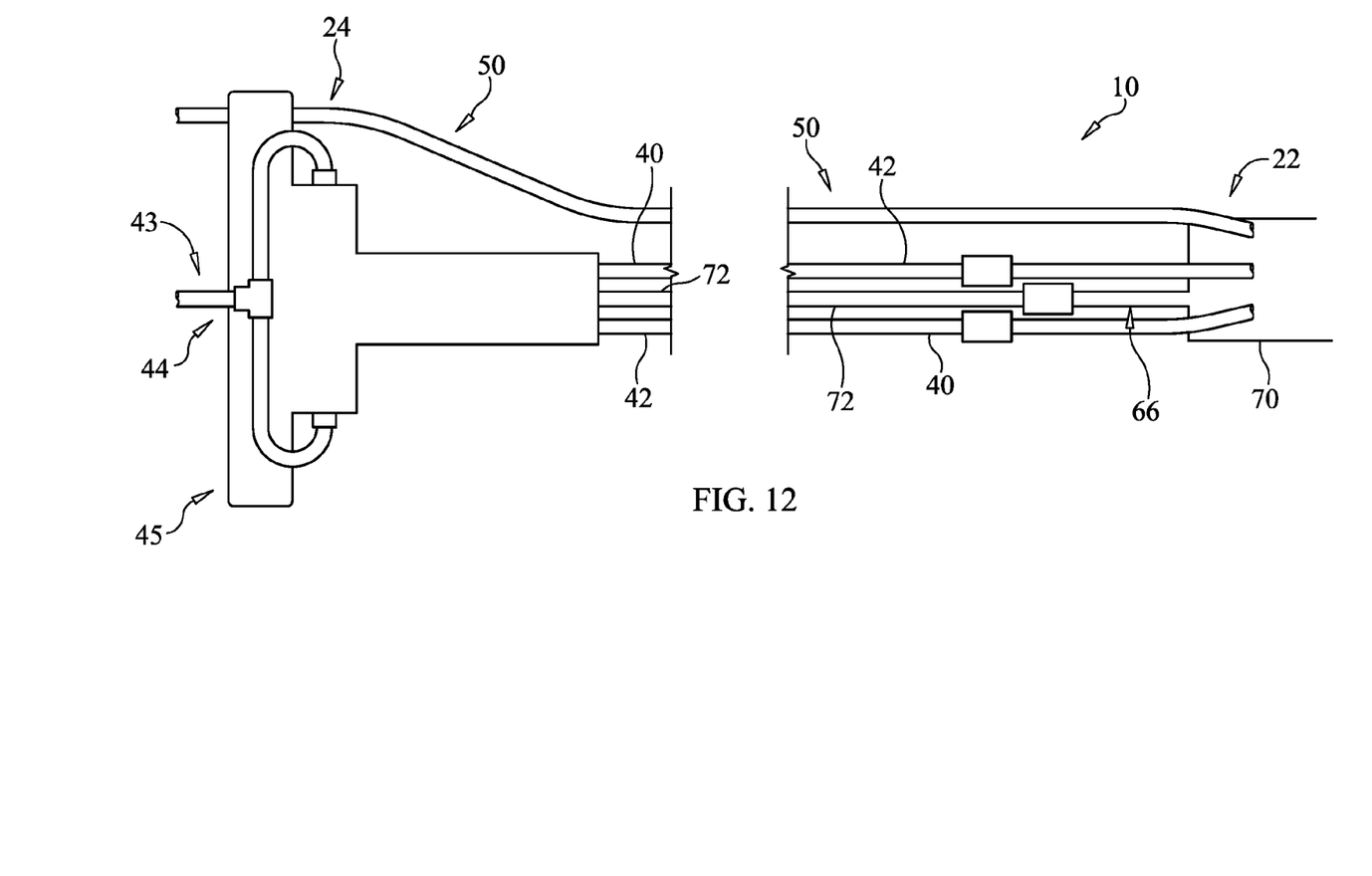
FIG. 12 is a top view of a trailing portion of the cutter of FIG. 1, showing the control lines connected to a control system.
Figure 13:
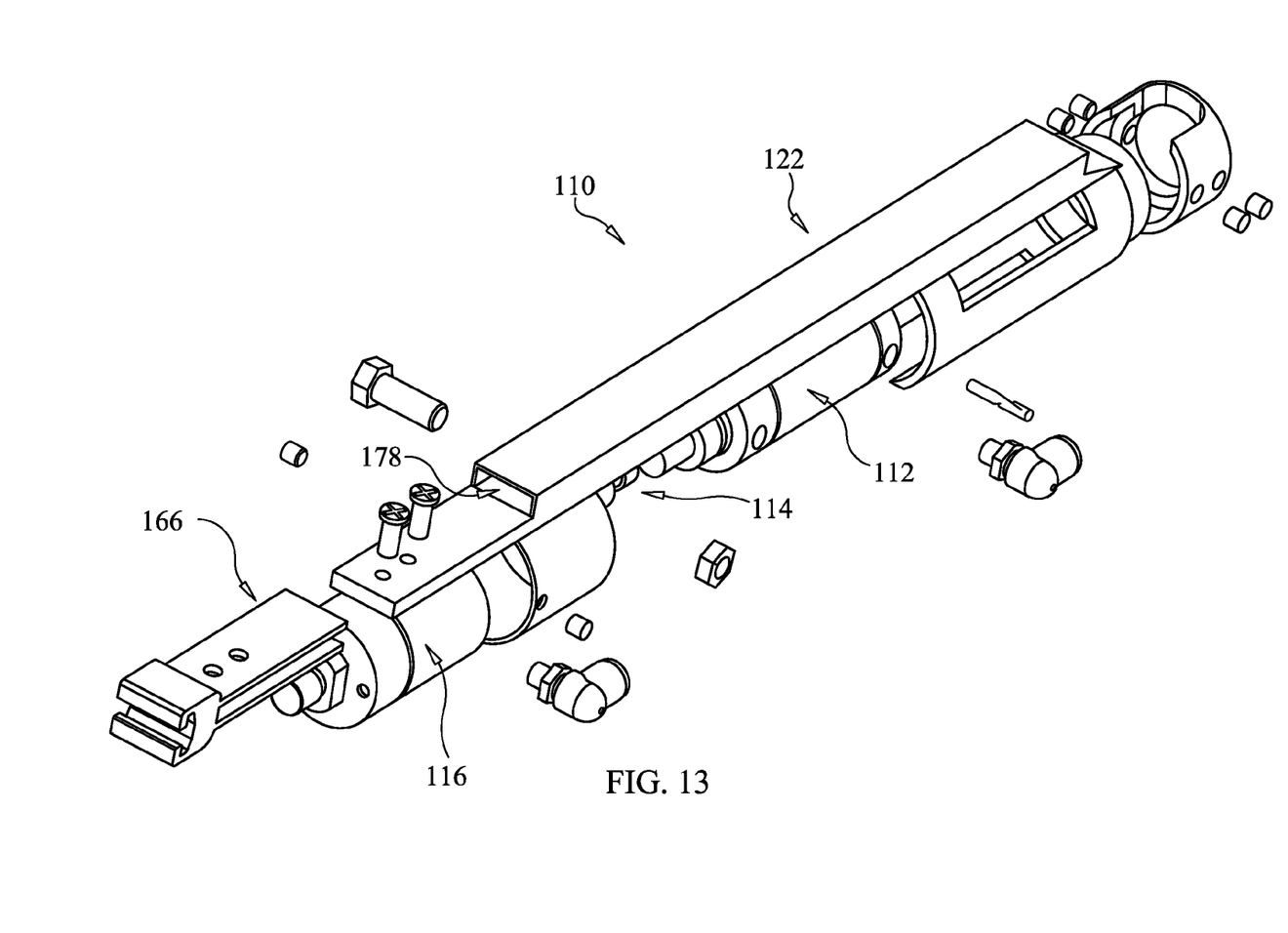
FIG. 13 is a perspective view of a lateral reinstatement cutter according to a second example embodiment of the invention.
Figure 14:
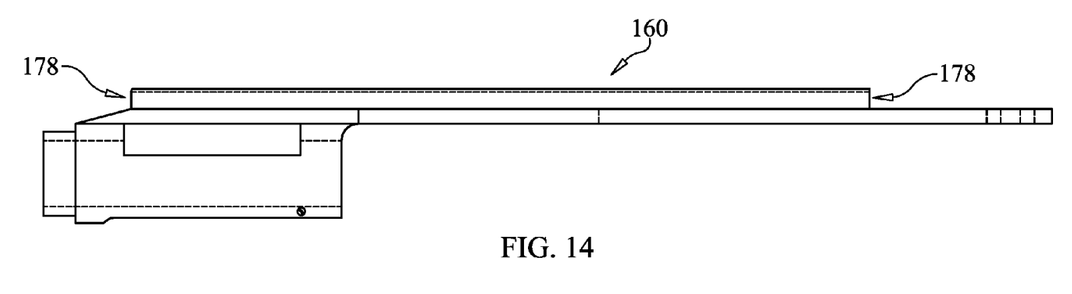
FIG. 14 is a side view of a main body of a mounting base of the cutter of FIG. 13.
Figure 15:
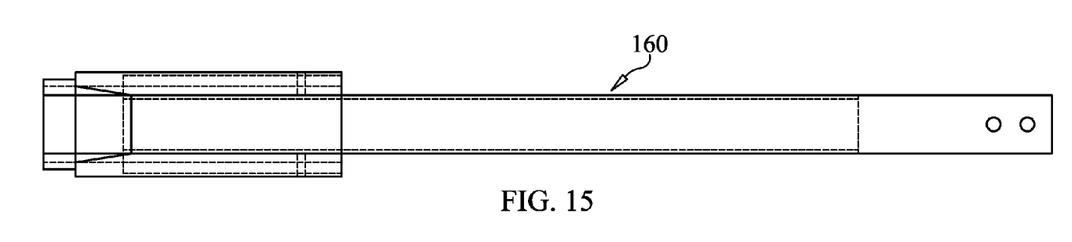
FIG. 15 is a top view of the main body of FIG. 14.
Figure 16:
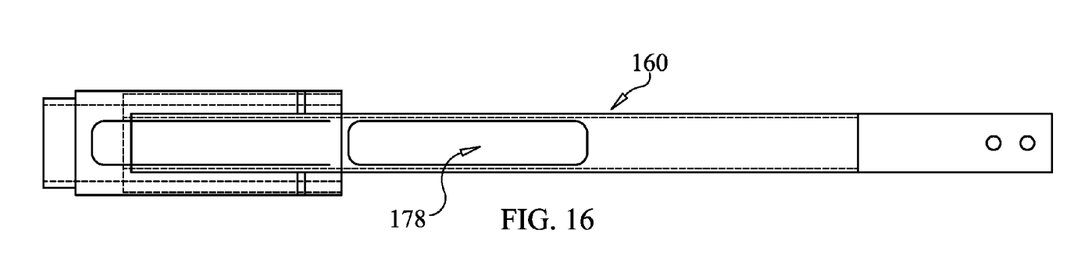
FIG. 16 is a bottom view of the main body of FIG. 14.

In addition, the extension adapter 166 of the base is in the form of a rectangular bar with a trailing-end connector for releasably connecting to the control (push/pull) rod. In the depicted embodiment, for example, the trailing-end connector is in the form of a claw.

Furthermore, the cutter 100 includes holders for the pivot drive 112 and the cutter drive 116. The pivot and cutter holders are attached to the base 122 and the pivot 114, and the drives 112 and 116 removably attach to the holders.

In another aspect, the invention relates to a method of reinstating lateral pipes that have become blocked during relining work by using a single access point/location. The reinstatement method described herein also represents a method of using the cutter 10 described herein.

Figure 17:
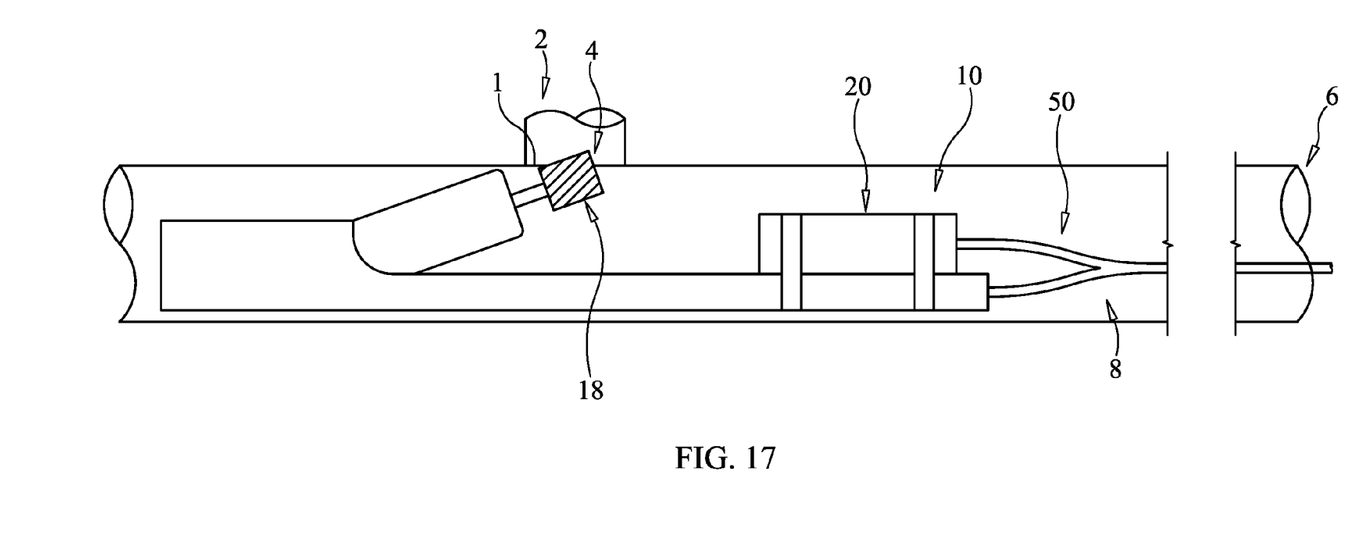
FIG. 17 is a side view of a single-access-point method of using a cutter according to example embodiments of the invention.

Referring particularly to FIG. 17, in an example method of use, the pipe 8 is accessed at a single access location 6, and the cutter 10 is sent into the pipe through the single access location. Because of the unique positional arrangement of the camera 20 and the cutting head 18, these two components are both inserted into the pipe 8 through the same single access location 6. The cutter 10 is moved (e.g., by a conventional push/pull control rod) to a lateral connection 4 for a lateral pipe 2 that needs to be reinstated. Then the cutter 10 is remotely controlled, by operating the control system 24, to activate the cutter drive 16 to turn on the cutting head 18 and to activate the pivot drive 12 to pivot the cutter drive and thus the cutting head from the stored position to the use position to cut out the reliner blockage. To remotely observe the cutting head 18 so that it can be properly positioned at the lateral connection 4 to cut out the blockage 1, the camera 22 is remotely controlled, by operating the control system 24, to capture images (e.g., video)

of the cutting head in the pipe 8. For embodiments in which the camera 20 is not mounted to the cutter 10, the separately positionable camera can then be inserted into the pipe 8 (e.g., after the cutter) from the same single access location 6 as the cutter. Once the blockage 1 has been cut out, the cutter 10 is operated to deactivate the cutting head 18 and pivot it back to its stored position. This process can then be repeated for any additional lateral blockages 1. The result is relatively fast and easy reinstatements of blocked lateral connections 4 from a single access location 6.

This method of use can be implemented for substantially horizontal pipes or for substantially vertical pipes. In the case of vertical vent stacks, for example, the cutter 10 can be sent down the pipe from an upper access location (e.g., a roof exhaust vent). The camera 20 can be easily mounted to the cutter 10, along with the cutting head 18, and sent through the same single access location to allow for fast and easy reinstatements. Because the camera 20 is positioned above the cutting head 18, reliner shavings from the reinstatement cutting do not fall onto the camera and obscure/distort the images captured by the camera.

In addition, these methods of use can be implemented for pipes of relatively small diameter. For example, the cutter 10 can be dimensioned to fit into and operate within smaller two-inch diameter pipe as well as in larger three- and four-inch (or larger) diameter pipe.

It is to be understood that this invention is not limited to the specific devices, methods, conditions, or parameters of the example embodiments described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "the" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the claimed invention has been shown and described in example forms, it will be apparent to those skilled in the art that many modifications, additions, and deletions can be made therein without departing from the spirit and scope of the invention as defined by the following claims.

What is claimed is:

1. A cutter for use with a cutting head that is operable to reinstate lateral pipes of a main pipe and a camera that captures images of the cutting head in operation, the cutter comprising:
    an elongate base defining a longitudinal axis and receivable in the main pipe;
    a cutter drive that is operable to drive the cutting head and that is pivotal between a stored position generally inline with the base and a use position generally pivoted relative to the base; and
    a pivot drive that is mounted to the base and that is operable between a stored position in which the cutter drive is in the cutter stored position and a use position in which the cutter drive is in the cutter use position, wherein the elongate base supports the cutter drive and extends longitudinally past the cutting head a sufficient distance to provide a location to mount the camera with a fixed gap formed between the camera lens and the cutting tip, and
    wherein when the cutter drive is in the cutter stored position, the attached thereto cutting head and the camera are positioned in series along the longitudinal axis of the base, with a cutting tip of the cutting head and a lens of the camera facing each other with the fixed gap therebetween, wherein the cutter is operable to reinstate the laterals from a single access location without separate access locations for the cutter and the camera.

2. The cutter of claim 1, wherein when the cutter drive is in the cutter stored position, the attached thereto cutting head and the camera are spaced apart on the elongate base and generally axially aligned.

3. The cutter of claim 1, wherein the cutter drive is a pneumatic rotary motor including a rotary shaft with a releasable coupling for removably attaching the cutting head.

4. The cutter of claim 1, wherein the pivot drive is a pneumatic cylinder with a piston that reciprocates linearly in operation between the stored position in which the piston is linearly retracted and the use position in which the piston is linearly extended.

5. The cutter of claim 1, further comprising a control system that operates the pivot drive and the cutter drive.

6. The cutter of claim 1, wherein the control system includes a control line for the pivot drive, a control line for the cutter drive, and a controller that operates the pivot drive and the cutter drive via the control lines.

7. A cutter for use with a cutting head that is operable to reinstate lateral pipes of a main pipe and a camera that captures images of the cutting head in operation, the cutter comprising:
    an elongate base defining a longitudinal axis and receivable in the main pipe;
    a cutter drive that is operable to drive the cutting head and that is pivotal between a stored position generally inline with the base and a use position generally pivoted relative to the base; and
    a pivot drive that is mounted to the base and that is operable between a stored position in which the cutter drive is in the cutter stored position and a use position in which the cutter drive is in the cutter use position, wherein the elongate base includes a leading portion and a trailing portion, wherein the cutter drive is pivotally mounted to the base leading portion and the camera mounts to the base trailing portion,
    wherein when the cutter drive is in the cutter stored position the cutting tip faces toward the base trailing portion and toward the single access location, and wherein the cutting head pivots forward about a pivot point that is forward of the cutting tip, and
    wherein when the cutter drive is in the cutter stored position the attached thereto cutting head and the camera are positioned in series along the longitudinal axis of the base, with a cutting tip of the cutting head and a lens of the camera facing each other with a fixed gap therebetween, wherein the cutter is operable to reinstate the laterals from a single access location without separate access locations for the cutter and the camera.

8. The cutter of claim 7, further comprising a cutter control line operably connected to the cutter drive and routed along the base from the base leading portion to the base trailing portion past the cutting head, wherein the base includes at least one retainer that retains the cutter control line laterally separated away from the cutting head.

9. The cutter of claim 8, wherein the base further includes at least one opening into which the cutter control line can be routed and received, and retained there by the retainer, laterally separated away from the cutting head.

10. The cutter of claim 9, wherein the opening is a slot formed longitudinally in the base and the retainers are pins extending laterally across the slot.

11. A method of using the cutter of claim 1, comprising:
accessing a pipe at a single access location;
sending the cutter into the pipe through the single access location, wherein the cutting head and the camera are both inserted into the pipe through the same single access location;
advancing the cutter to a lateral pipe that is blocked and needs to be reinstated;
operating the cutter drive to turn on the cutting head and operating the pivot drive to pivot the cutter drive and the attached thereto cutting head from the stored/inline position to the use/pivoted position to reinstate the lateral while remotely observing the cutting head via the camera.

12. The method of claim 11, wherein the step of sending the cutter into the pipe includes inserting into the pipe a leading portion of the base to which the cutter drive is mounted before a trailing portion of the base to which the camera is mounted.

13. A cutter for use with a cutting head that is operable to reinstate lateral pipes of a main pipe and a camera that captures images of the cutting head in operation, the cutter comprising:
an elongate base defining a longitudinal axis and receivable in the main pipe,
a cutter drive that is operable to drive the cutting head and that is pivotal between a stored position generally inline with the base and a use position generally pivoted relative to the base;
a pivot drive that is mounted to the base and that is operable between a stored position in which the cutter drive is in the cutter stored position and a use position in which the cutter drive is in the cutter use position; and
a pivot, wherein the cutter drive is driven by the pivot drive indirectly via the pivot to pivot between the stored and use positions, and wherein the pivot includes an L-shaped member that rotationally engages the cutter drive, is engaged by the pivot drive, and translates between a stored/normal position and a use/pivoted position,
wherein when the cutter drive is in the cutter stored position, the attached thereto cutting head and the camera are positioned in series along the longitudinal axis of the base, with a cutting tip of the cutting head and a lens of the camera facing each other with a fixed gap therebetween, wherein the cutter is operable to reinstate the laterals from a single access location without separate access locations for the cutter and the camera.

14. A cutter for reinstating lateral pipes of a main pipe, the cutter comprising:
an elongate base defining a longitudinal axis, including a leading portion and a trailing portion, and receivable in the main pipe;
a cutting head that is operable to reinstate the lateral pipes;
a cutter drive that is operable to drive the cutting head, that is pivotally mounted to the base leading portion, and that is pivotal between a stored position generally inline with the base and a use position generally pivoted relative to the base;
a pivot drive that is mounted to the base and that is operable between a stored position in which the cutter drive is in the cutter stored position and a use position in which the cutter drive is in the cutter use position;
a camera that mounts to the base trailing portion to capture images of the operation of the cutting head for remote viewing by an operator of the cutter; and
a control system including a control line for the pivot drive and a control line for the cutter drive,
wherein when the cutter drive is in the cutter stored position, the attached thereto cutting head and the camera are positioned in series along the longitudinal axis of the base, spaced apart and generally axially aligned, with a cutting tip of the cutting head and a lens of the camera facing each other with a fixed gap therebetween, wherein the cutter is operable to reinstate the laterals from a single access location without separate access locations for the cutter and the camera, and wherein the cutter control line is routed along the base from the base leading portion to the base trailing portion past the cutting head, wherein the base includes at least one retainer that retains the cutter control line laterally separated away from the cutting head, wherein when the cutter drive is in the cutter stored position the cutting tip faces toward the base trailing portion and toward the single access location, and wherein the cutting head pivots forward about a pivot point that is forward of the cutting tip.

15. The cutter of claim 14, wherein the base further includes at least one opening into which the cutter control line can be routed and received, and retained there by the retainer, laterally separated away from the cutting head.

16. A method of using the cutter of claim 14, comprising:
accessing the pipe at the single access location;
sending the cutter into the pipe through the single access location, wherein the cutting head and the camera are both inserted into the pipe through the same single access location with the cutter drive inserted before the camera;
advancing the cutter to one of the lateral pipes that is blocked and needs to be reinstated;
operating the cutter drive to turn on the cutting head and operating the pivot drive to pivot the cutter drive and the attached thereto cutting head from the stored/inline position to the use/pivoted position to reinstate the blocked lateral while remotely observing the cutting head via the camera.

17. A device for use with a tool head that is used for pipe maintenance and a camera that captures images of the tool head in operation, the device comprising:
an elongate base defining a longitudinal axis and receivable in the pipe;
a tool drive that is operable to drive the tool head and that is pivotal between a stored position generally inline with the base and a use position generally pivoted relative to the base; and
a pivot drive that is mounted to the base and that is operable between a stored position in which the tool drive is in the tool stored position and a use position in which the tool drive is in the tool use position,
wherein when the tool drive is in the tool stored position, the attached thereto tool head and the camera are positioned in series along the longitudinal axis of the base, with a tool tip of the tool head and a lens of the camera facing each other with a fixed gap there between, wherein the device is operable to maintain the pipe from a single access location without separate access locations for the device and the camera, and wherein the elongate base supports the tool drive and extends longitudinally past the tool head a sufficient distance to provide a location to mount the camera with the gap formed between the camera lens and the tool tip.

\* \* \* \* \*